United States Patent [19]

Pierson

[11] Patent Number: 4,857,194

[45] Date of Patent: Aug. 15, 1989

[54] INTERMITTENT VACUUM FILTER APPARATUS INCORPORATING A DOUBLE VALVE ARRANGEMENT

[75] Inventor: Henri G. W. Pierson, Tenerife, Spain

[73] Assignee: D & C Limited, Monrovia, Liberia

[21] Appl. No.: 181,103

[22] Filed: Apr. 13, 1988

[30] Foreign Application Priority Data

Apr. 13, 1987 [GB] United Kingdom ............... 8708779

[51] Int. Cl.[4] .................. B01D 29/02; B01D 33/04
[52] U.S. Cl. .................... 210/406; 210/400; 210/416.1
[58] Field of Search ............. 210/138, 400, 401, 406, 210/416.1, 472

[56] References Cited

U.S. PATENT DOCUMENTS

| | | | |
|---|---|---|---|
| 2,779,477 | 1/1957 | Swensen | 210/416.1 |
| 3,870,641 | 3/1975 | Pierson | 210/406 |
| 4,123,360 | 10/1978 | Havalda | 210/400 |
| 4,186,090 | 1/1980 | van Oosten | 210/400 |
| 4,495,070 | 1/1985 | Pierson | 210/406 |
| 4,761,226 | 8/1988 | Creps | 210/416.1 |

Primary Examiner—Richard V. Fisher
Assistant Examiner—Linda S. Evans
Attorney, Agent, or Firm—Dennison, Meserole, Pollack & Scheiner

[57] ABSTRACT

A double valve arrangement is installed in intermittently operating vacuum filter apparatus in a pipeline connecting the filter means to a vacuum source to vent the line to atmosphere whenever the vacuum is shut off. This valve arrangement comprises a pipe section provided with a lateral opening, connected to the filter means, and with internal mutually facing annular shoulders disposed at respective sides of the lateral opening, and a piston-mounted sealing disc which is of smaller diameter than the pipe section and is reciprocable inside same to abut sealingly the one or the other of the shoulders and thereby bring the lateral opening into communication with the respective opposing end of the pipe section, which is connected, respectively, either to the vacuum source or to atmosphere. An annular gap is always present between the peripherly of the disc and the internal surface of the pipe section so that movement of the disc, e.g. at a frequency of 5 to 20 cycles per minute, is not impeded by rubbing.

5 Claims, 4 Drawing Sheets

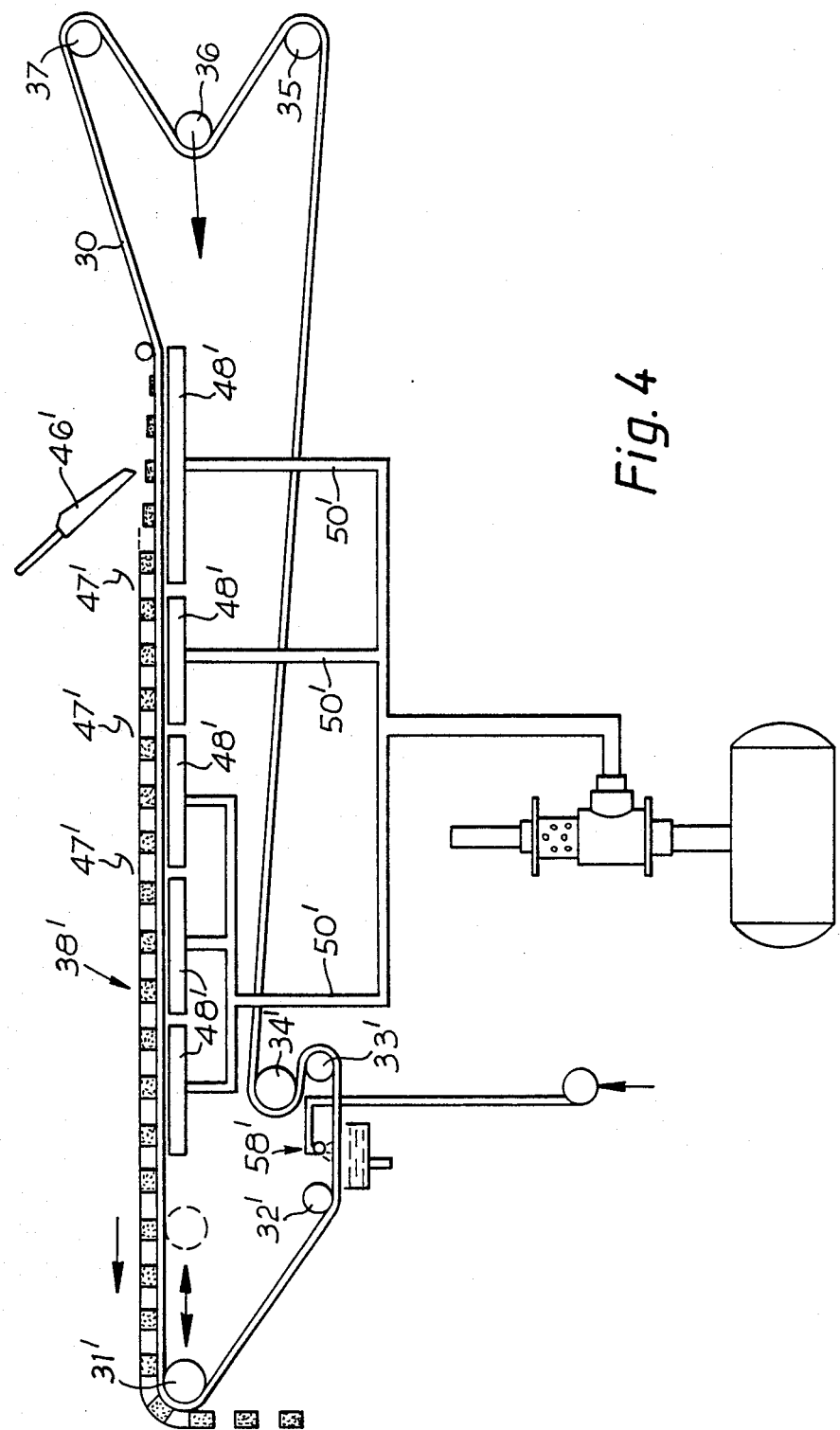

INTERMITTENT VACUUM FILTER APPARATUS INCORPORATING A DOUBLE VALVE ARRANGEMENT

TECHNICAL FIELD

This invention concerns intermittent vacuum filter apparatus.

BACKGROUND ART

One well known form of such apparatus as disclosed in the inventor's prior patents comprises an endless filter belt or cloth guided to provide a substantially horizontal upper run onto which is fed slurry required to be filtered. The belt or cloth is moved forward stepwise so as to progress successive portions of the upper run over a series of vacuum boxes or trays which serve to suck away liquid from the slurry and leave solid from the slurry deposited on the belt or cloth as filter cake. However, other forms of equipment are also known.

In a pipeline leading from the filter means of such apparatus, i.e. from the vacuum boxes or trays in the above-described example, two valves are disposed, which work in opposite manner. Firstly, there is a valve connected to a vacuum source whereby the latter is either connected to the filter means (the vacuum boxes or trays) or disconnected therefrom. Secondly there is a vent valve whereby the pipeline can be connected to atmosphere. One of these may be in a straight-through pipe and the other in a lateral branch. During filtration the vacuum valve is open and the vent valve closed, whereas between filtration periods, e.g. when the belt is being progressed in a belt filter the vent valve is open and the vacuum valve closed.

One of the most important points with regard to the current invention is that these valves are required to change over very frequently, for example every 10 seconds, namely 6 cycles per minute.

A slow acting valve arrangement increases inefficiency by increasing the time during cycling when no filtration takes place.

In contrast, extremely reliable, tight sealing is not essential. In this respect, any vacuum filter has a considerable amount of vacuum leaks, for example through the filter cake and filter cloth, both of which are porous, so slight additional leakage at the valve is of no consequence. Thus, the valves do not have to be of a construction which ensure hermetic sealing and can be of a somewhat "rough and ready" design, particularly since the maximum pressure differential is only 1 atmosphere.

Commercially available valves are not consistent with the aforesaid requirements and are generally unsuitable. They tend to seal hermetically against relatively high pressures, with the seal becoming progressively tighter with time and hence slower in operation. In any event, they are designed for relatively low frequency cycling, e.g. once every 10 minutes, rather than every 10 seconds.

OBJECT OF THE INVENTION

The object of the present invention is to design a valve arrangement for intermittent filter apparatus which meets the aforesaid requirements and does not have the disadvantages of known commercially available valves.

SUMMARY OF THE INVENTION

Pursuant hereto, the present invention proposes intermittent vacuum filter apparatus incorporating a double valve arrangement operative to connect the filter means alternatively to a vacuum source and to atmosphere, said arrangement comprising a pipe section provided with a lateral opening and, internally, with mutually facing annular shoulders which are disposed at respective sides of the lateral opening, and a piston-mounted sealing disc which is of smaller diameter than the pipe section and is reciprocable inside the pipe sections so as to abut sealingly the one or the other of the shoulders and thereby bring the lateral opening into communication with the respective opposing end of the pipe section, which is connected, respectively, either to a vacuum source or to atmosphere, an annular gap always being present between the periphery of the disc and the internal surface of the pipe section.

To avoid the need for difficult machining of the pipe section interior and to facilitate assembly and adaptation of the arrangement to each site of installation, the mutually facing shoulders are advantageously provided by cylindrical insert elements.

The pipe section is conveniently in the form of a tee-piece.

The actuator means for the piston should clearly be of extreme robustness and reliability, and capable of operating at a rate of from 5 to 20 cycles per minute. Previously available actuators for use in vacuum apparatus were not of this type. They were designed for slower operation and frequently failed in a short time if operated at the higher rate required in these circumstances.

In accordance with the construction of the invention, the sealing disc in the valve arrangement has no rubbing surfaces so it does not get tighter with time as is the case with ball valves, gate valves, butterfly valves and spool valves. The actuator is preferably a highly reliable pneumatic cylinder, which, after overcoming inertia, simply pulls the disc through clear air, i.e. at a clearance from the surrounding pipe section wall. Although the sealing member, in the form of a simple disc, does occasionally leak a little, this does not matter; it has little effect on the efficiency of the valve arrangement. Most importantly the cost of such an arrangement is less than 25% of the least expensive commercially available alternatives. One reason for this is the use of inexpensive readily available components for production of the proposed device. Another reason is that sealing of the actuator relative to the valve is not required.

BRIEF DESCRIPTION OF THE DRAWINGS

The invention will be described further, by way of example, with reference to the accompanying drawings, in which:

FIG. 4 is a more schematic side view of another embodiment of apparatus in accordance with the invention which incorporates a valve arrangement as shown in FIGS. 1 or 2.

DETAILED DESCRIPTION OF ILLUSTRATED EMBODIMENTS

Figure 1:
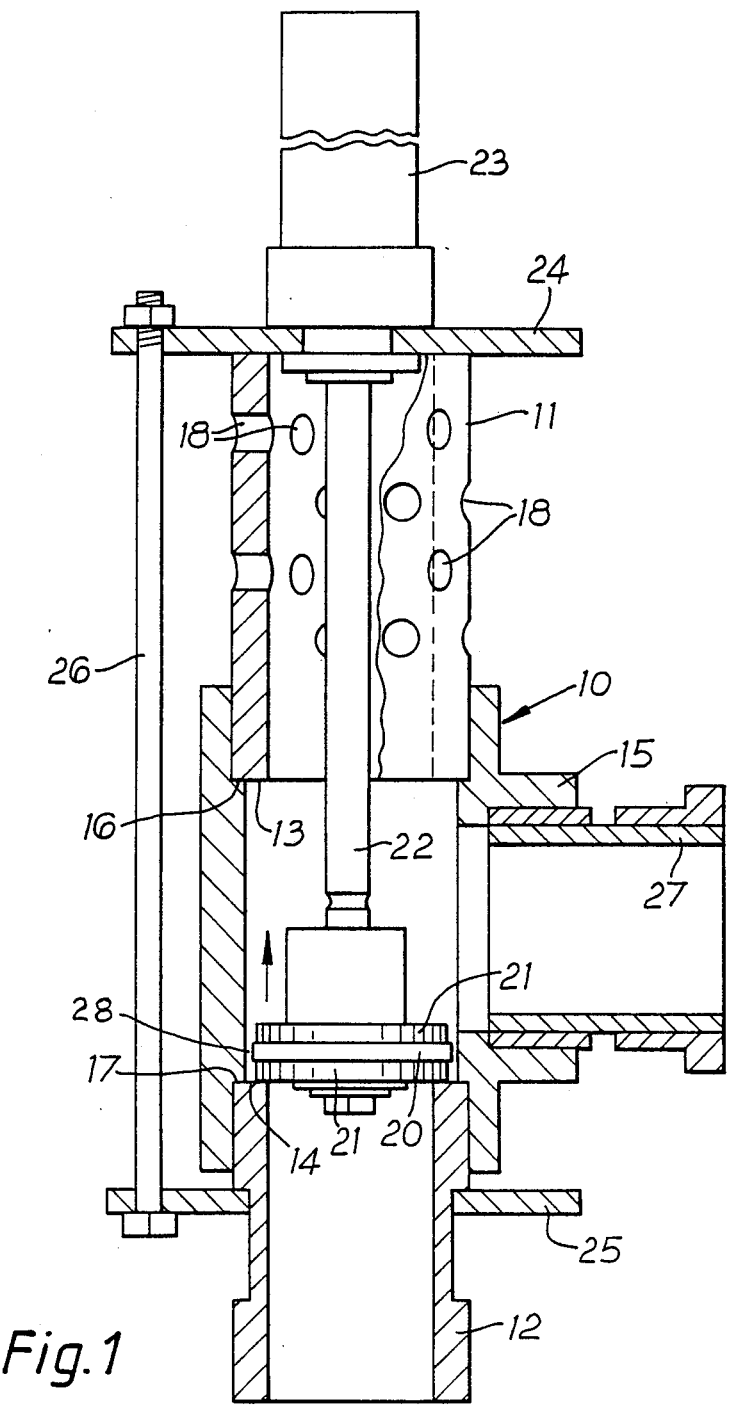
FIG. 1 is a cross-sectional side elevation of a first practical embodiment of a double valve arrangement which may be incorporated in the vacuum filter apparatus of the invention.

Referring first to FIG. 1, in this example of a double valve arrangement, pipe section means provided with a lateral opening is constituted by a tee-piece 10 into which respective cylindrical inserts 11,12 are fitted to provide mutually facing annular shoulders 13, 14 at respective sides of the lateral arm 15 of the tee-piece 10. In this respect, the internal surface of the teepiece 10 is formed at a spacing from each end with a shallow outwardly facing shoulder 16, 17 providing a seat for the end of the respective insert 11, 12. The inserts 11, 12 are welded or screwed in position and the annular shoulders 13, 14 provided thereby are substantially perpendicular to the longitudinal axis of the tee-piece 10.

A disc 20, fitted on each side with sealing material 21, such as rubber, is connected to a piston rod 22 which extends axially of the tee-piece 10. The piston rod 22 extends from a pneumatic cylinder 23 mounted above the insert 11, at the top of the figure. The diameter of the disc 20 is less than the internal diameter of the tee-piece 10 so that an annular gap 28 remains therebetween. However, the diameter of the disc 20 is sufficient to ensure contact between its circumferential margin and the respective shoulders 11, 12.

The insert 11 is in the form of a perforated tube or spool, being provided with a series of apertures 18.

The arrangement is held between plates 24, 25 by four tie rods 26, although only one is shown in FIG. 1.

In use, the lateral arm 15 of the tee-piece 10 is connected to a pipe 27, e.g. by welding, as shown, or by a flange connection, which leads to a filter, or to a vacuum tray underlying a filter belt while the insert 12 is connected to a vacuum source. The apertures 18 in the insert 11 simply communicate with atmosphere. The pneumatic cylinder 23 operates to extend and retract the piston rod 22 and thus force the disc 20 alternately into close sealing abutment against the lower shoulder 14 and the upper shoulder 13. When the disc 20 abuts the upper shoulder 13, the lateral arm 15 communicates with the insert 12. The filter is thus connected to the vacuum source and filtrate is sucked through the valve arrangement towards the vacuum source. Subsequently, as the disc 20 is forced downwards again the vacuum is reduced and the filtrate line is vented, abutment of the disc 20 against the lower shoulder 14 shutting off the vacuum altogether. Reciprocation of the disc 20 within the tee-piece 10 thus results in alternate evacuation and venting of the filter.

When the cylinder 23 receives a signal to change over and the disc 20 is in its lowermost position, pressure builds up in the cylinder until this overcomes the suction of the vacuum on the disc 20. As soon as the disc 20 lifts off its seat 14 the suction is broken and the full pressure of the cylinder 23 pulls the disc 20 through clear air until it seats against the opposing upper shoulder 13. Movement of the disc 20 between the two shoulders 13, 14 is very rapid indeed, taking only a fraction of a second. Change-over may occur, for example, every 10 seconds.

The proposed arrangement constitutes a compact and versatile unit of much simpler construction than previous arrangements which incorporated two or even three valves and required co-ordination of their operation. Moreover, with the reduced diameter disc 20 and the preferred perpendicular abutment shoulders 13, 14 the disc 20 does not have to slide across and rub along the inside of the tee-piece 10 during the course of operation so wear is minimized and many thousands of cycles of operation can be accomplished before sealing is impaired and the disc 20 needs to be replaced. In any event the disc 20 is much simpler and less expensive to produce than known plug or ball valves.

Figure 2:
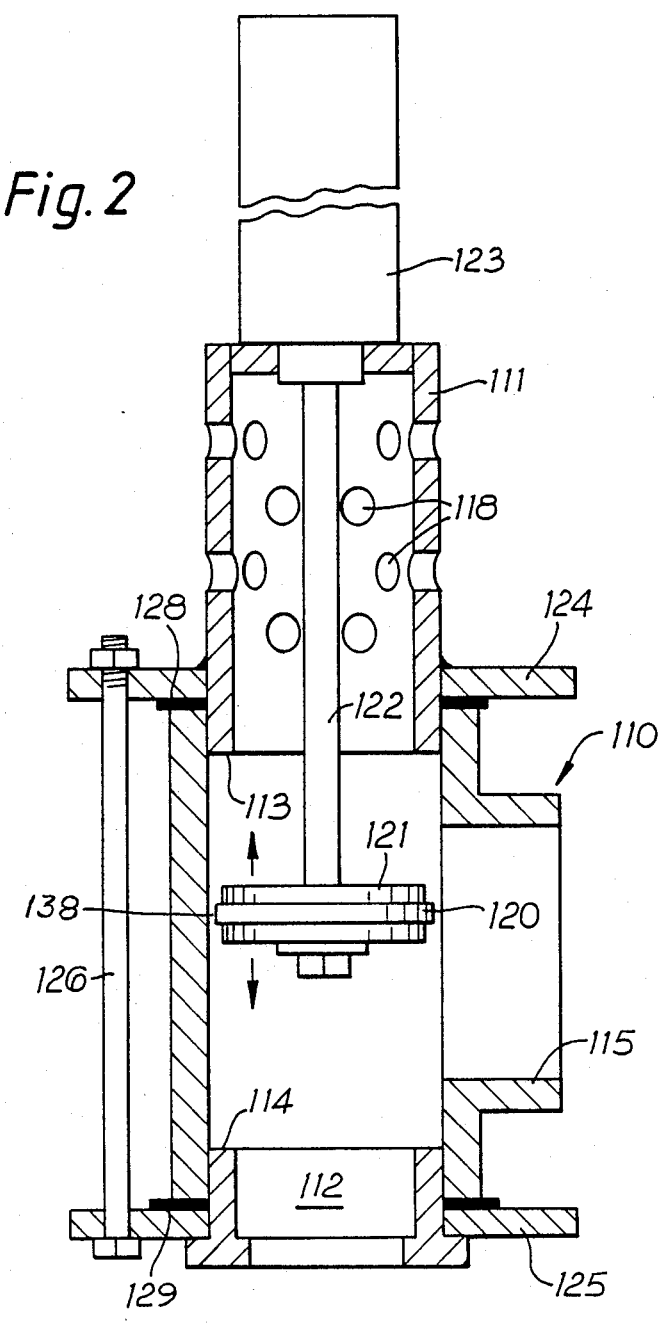
FIG. 2 is a similar view of a modified embodiment.

A somewhat modified arrangement is shown in FIG. 2. In this example, respective cylindrical inserts 111, 112 are again fitted into opposing ends of a tee-piece 110 to provide mutually facing shoulders 113, 114 at respective sides of the lateral arm 115 of the tee-piece 110. In this case, however, the position of the inserts 111, 112 is not determined by the presence of shoulders formed in the interior of the tee-piece, as the latter are lacking. The upper insert 111 in the form of a perforated spool, having apertures 118, is welded, part way along its exterior, to a rectangular flange 124, which rests on top of the tee-piece 110, with a gasket 128 therebetween. The lower insert 112 is likewise connected to a flange 125 which abuts the lower end of the tee-piece 110 by way of a gasket 129. The respective flanges are again connected by four tie rods 126 (only one shown).

Inside the tee-piece 110 a steel disc 120, covered on both sides by rubber 121, is threadedly connected to a piston 122 of a pneumatic cylinder 123 positioned above the spool 111. As in the arrangement of FIG. 1, and as illustrated in FIG. 2, the diameter of the disc 120 is less than the internal diameter of the tee-piece 110 so that an annular gap 138 remains therebetween.

Just as in the FIG. 1 embodiment, in use, the lateral arm 115 of the tee-piece 110 is connected to a vacuum tray, constituting part of the filtering means, while the insert 112 is connected to a vacuum source. The cylinder 123 reciprocrates the disc 120 between sealing abutment with the respective shoulders 113, 114, thus alternately connecting the filtrate line to the vacuum source and to atmosphere.

The same manner of operation and advantages apertain as in the FIG. 1 embodiment.

Figure 3:
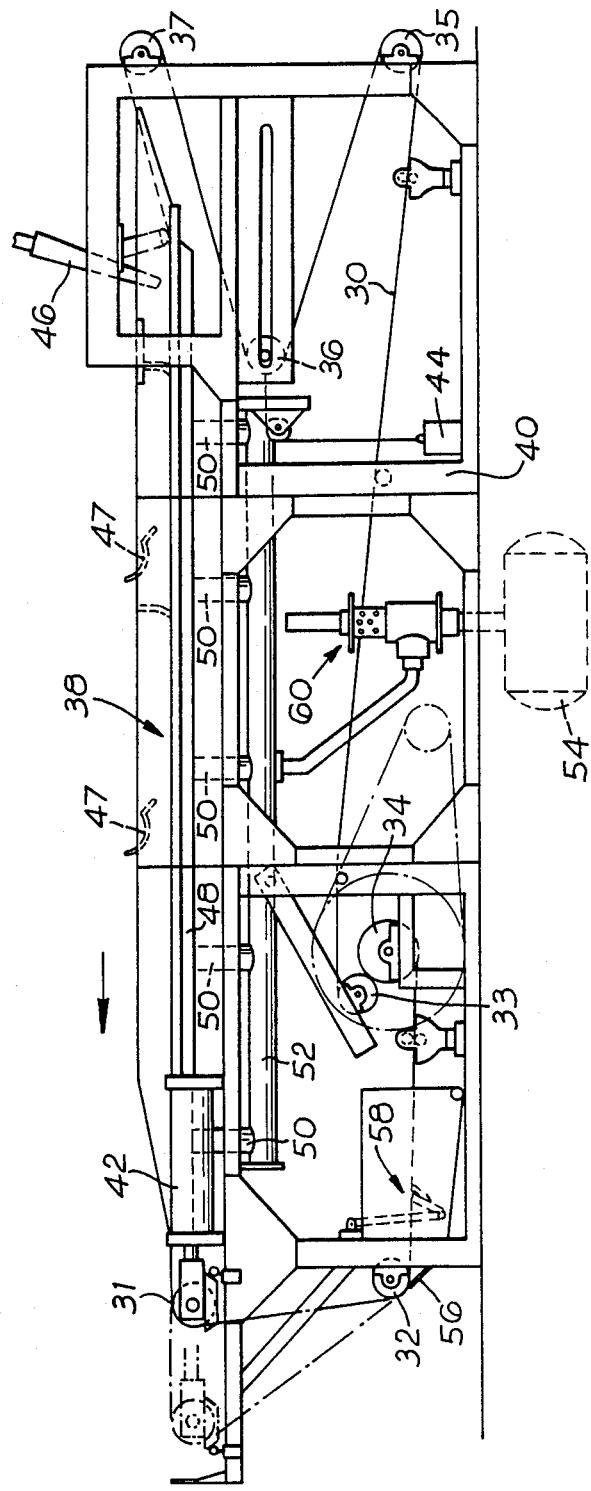
FIG. 3 is a diagrammatic side view, to a much reduced scale of one embodiment of apparatus in accordance with the invention which incorporates a valve arrangement as shown in FIGS. 1 or 2.

For full understanding of the positioning and purpose of the aforesaid double valve arrangement, as shown in FIGS. 1 and 2, two versions of vacuum filter apparatus in which such arrangement may advantageously be used are shown in FIGS. 3 and 4.

In the first version, shown in FIG. 3, an endless filter belt 30 is guided around various rollers 31 to 37, which are supported by a framework 40 to provide a substantially horizontal upper run 38 and a lower returned run. The upper run 38 is moved stepwise in the direction indicated by the arrow by reciprocation of the downstream roller 31 by a cylinder 42. When the roller 31 is pushed forwards to the position shown in broken lines, the upper run progresses by a fixed distance. Reverse movement of the lower run is prevented by a one way device, e.g. a one way drive or a pawl and rachet arrangement, provided on the roller pair 33, 34. Tensioning roller 36 moves to the right in its guide slot upon the aforesaid forward movement of the roller 31. When the roller 31 is pulled back again, slack is taken up by movement of the tensioning roller 36 to the left under influence of weight 44.

Each time, after the upper run 38 has moved forward, slurry to be filtered is supplied thereto at the downstream end by feed means 46. During stepwise progression of the upper run 38, the belt 30 and the slurry deposited thereon are washed by sprays 47 and are moved over successive sections of a vacuum tray 48. The sections are connected by respective pipes 50 to a manifold 52, which is connected to a vacuum source, e.g. a vacuum pump 54. The double valve arrangement of either FIG. 1 or FIG. 2 is installed in the pipeline leading from the manifold 52 to the pump 54, as indicated generally at 60. The vacuum tray 48 and hence the slurry is subject to vacuum while the belt 30 is stationary. Each time the belt 30 is to be progressed, the vacuum is shut off—by movement of the disc 20 or 120 from shoulder 13 or 113 to 14 or 114—and the connecting pipelines are vented to atmosphere and remain so while the movement takes place. Once the belt 30 has stopped again, i.e. when the roller 31 reaches its extreme forward position, the vacuum is reapplied by movement of the disc 20 back to abutment against shoulder 13 or 113 in the device 60.

By the end of the upper run, the slurry has had all liquid removed and a solid filter cake remains on the belt 30 for removal by a doctor blade 56, prior to washing at 58.

The second version of the filter apparatus, as shown in FIG. 4, is illustrated more schematically. It operates in an analogous manner to the FIG. 3 example so will not be described in detail. The parts shown are indicated by the corresponding reference numbers used in FIG. 3 surmounted by '.

I claim:

1. An intermittent vacuum filter apparatus including a filter means, means defining a vacuum source, means for communicating with the atmosphere, and a double valve arrangement installed in a pipeline connecting said filter means to said means defining a vacuum source and said means for communicating with the atmosphere, said arrangement comprising:

a pipe section having a first end connected to said means defining a vacuum source, a second end connected to said means for communicating with the atmosphere, and a lateral opening means connected to said filter means, said pipe section also being provided, internally, with mutually facing annular shoulders which are disposed at respective sides of said lateral opening means;

a pneumatic cylinder having a piston projecting into and reciprocable within said pipe section; and a sealing disc, of smaller diameter than said pipe section, mounted on said piston and reciprocable thereby inside said pipe section to abut sealingly against the one or the other of said shoulders and thereby bring said lateral opening means alternately into communication with said first and second ends of said pipe section, which are connected, respectively to the means defining a vacuum source and to the means for communicating with the atmosphere, an annular gap always being present between the periphery of said disc and the internal surface of said pipe section.

2. Apparatus as set forth in claim 1 wherein cylindrical insert elements provide said mutually facing annular shoulders.

3. Apparatus as set forth in claim 1 wherein said pipe section has a longitudinal axis, and said mutually facing shoulders project from the internal surface of said pipe section substantially perpendicularly to the longitudinal axis of said pipe section.

4. An arrangement as set forth in claim 1 wherein said pipe section is in the form of a tee-piece.

5. Apparatus as set forth in claim 1 wherein a perforated tubular element is attached to said second end of said pipe section to connect said pipe section to the means for communicating with the atmosphere.

* * * * *